United States Patent [19]

Strasser

[11] 4,317,864

[45] Mar. 2, 1982

[54] BATTERY CONSISTING OF A MULTIPLICITY OF ELECTROCHEMICAL CELLS

[75] Inventor: Karl Strasser, Erlangen, Fed. Rep. of Germany

[73] Assignee: Siemens Aktiengesellschaft, Munich, Fed. Rep. of Germany

[21] Appl. No.: 918,954

[22] Filed: Jun. 26, 1978

[30] Foreign Application Priority Data

Jun. 30, 1977 [DE] Fed. Rep. of Germany ....... 2729640

[51] Int. Cl.³ .......................... H01M 2/10; H01M 8/02
[52] U.S. Cl. ........................................ 429/36; 429/66; 429/38
[58] Field of Search .................... 429/34, 35, 36, 37, 429/38, 39, 66, 12, 26

[56] References Cited

U.S. PATENT DOCUMENTS 3,589,942  6/1971  Leitz et al. ............................ 429/26
3,615,852  10/1971 Gehring ................................ 429/38
3,900,342  8/1975  Hohne et al. ....................... 252/472

FOREIGN PATENT DOCUMENTS

1236872 · 6/1971 United Kingdom ................. 429/34

Primary Examiner—Donald L. Walton
Attorney, Agent, or Firm—Kenyon & Kenyon

[57] ABSTRACT

A battery consisting of a multiplicity of electrochemical cells, in particular fuel cells for the conversion of at least one gaseous reactant, with electrodes consisting of catalytic material in powder form and spacer screens for the support of the catalytic material, and with pressure pads to compress the entire arrangement, in which, there are provided, between the spacer screens of each two adjacent cells of such a battery, and at the battery ends, metallic contact pieces used as current collectors, each of which contains a cavity to which a pressurized medium is fed in the sense of exerting a uniform pressure on the catalyic material of the adjacent cells, with the cavities of the contact pieces of the battery advantageously connected through channels to the supply system of one of the gaseous reactants, in particular hydrogen.

10 Claims, 3 Drawing Figures

BATTERY CONSISTING OF A MULTIPLICITY OF ELECTROCHEMICAL CELLS

BACKGROUND OF THE INVENTION

This invention relates to batteries in general and more particularly to a battery consisting of a multiplicity of electrochemical cells, in particular fuel cells for the conversion of at least one gaseous reactant.

Batteries consisting of a multiplicity of fuel cells with a support frame for the accommodation of a liquid electrolyte for each cell; with a diaphragm, gastight in its liquid impregnated state, on at least one side of the support frame; with an electrode consisting of catalytic material in powder form, strengthened by a binder, if applicable, on the diaphragm side facing away from the support frame; and with a spacer screen for the support of the catalytic material, as well as with pressure pads for the compression of the entire arrangement, are known.

In tests conducted with fuel cells and fuel cell batteries for the conversion of gaseous reactants and a liquid electrolyte, using what are known as supported electrodes consisting of catalytic material in powder or bonded form as gas diffusion electrodes, it has become clear that, in operation, special importance must be attributed to the mechanical pressure on the electrodes. For, it has turned out that, if the pressure exerted on the individual areal elements of the electrodes is uneven, the consequence is a great spread in the characteristic current/voltage curves of the individual cells. The differing bearing pressure is a result of both a deformation of the end plates which clamped together by means of tension bolts and a change in the electrodes occurring during operation. For, it was found that the mechanical pressure becomes diminished in a battery with nickel electrodes, for instance, by a loss of volume due to the reactivation, and in the case of silver electrodes by "flowing" of the catalytic material. In addition, another consequence of the resultant different bearing pressure is increased aging of the catalytic material.

British Pat. No. 1,236,872 teaches eliminating difficulties occurring due to a varying bearing pressure when electrodes in powder form are used in electrochemical cells or in batteries consisting of several such cells by using so-called pressure pads filled with gas or liquid and disposed on the side of the electrodes facing away from the electrolyte, with the interposition of metal and/or plastic screens for the compression of the entire arrangement. These pressure pads are containers, provided in addition to the usual components in the battery, which are located in or in front of the end plates or particularly between individual cells or groups of several cells. In electrochemical cells, in particular fuel cells, the electrodes of catalytic material in powder form, strengthened by binders if applicable, and of uniform pore structure, are separated by a support frame filled with liquid electrolyte and provided on both sides with a fluid permeable, gastight diaphragm, or by an ion exchange resin diaphragm.

Now, it has been shown that a varying bearing pressure can be largely avoided and most problems associated with it eliminated by the measures described. But pressure pads of the kind mentioned mean a considerable structure expense because additional components must be used in the battery; in addition, they also require more space and thus have an effect particularly on the power to volume ratio of the battery.

SUMMARY OF THE INVENTION

It is an object of the present invention to avoid, in a battery of the kind described at the outset and consisting of a multiplicity of electrochemical cells, a varying distribution of pressure on the individual areal elements of the electrodes consisting of catalytic material in powder form and supported by means of spacer screens, without thereby increasing the structural expense.

According to the present invention, this is accomplished in that there are disposed, between the spacer screens of each two adjacent cells and at the battery ends, metallic contact pieces for current collection and that each of the contact pieces contain a cavity to which a pressurized medium can be supplied, in the sense of exerting a uniform bearing pressure on the catalytic material of the adjacent cells.

In comparison to known batteries in which measures for the achievement of a uniform bearing pressure have also been taken, the battery according to the present invention offers the advantage of a relatively simple structural design. For, battery components already present, in one form or another anyway namely the current collectors, are, in accordance with the present invention, designed so that they can be used as pressure pads. In the present case, current collectors in the form of contact pieces with a cavity are employed for the purpose. In the batteries according to the British Pat. No. 1,236,872, on the other hand, electrically conducting nets and screens serve as current collectors. Beyond this, the battery according to the present invention has the further advantage of requiring no additional space for the pressure pads.

During operation, a pressurized medium, either a gas or a liquid, is supplied to the cavities of the battery's contact pieces. Nitrogen, for example, may be used as a pressure gas and water as a pressure fluid. But, it is particularly advantageous to use one of the gaseous reactants of the battery, preferably hydrogen as the pressure medium. The cavities of the contact pieces are then connected to the respective gas supply system of the battery, i.e. in particular to the hydrogen or oxygen or air supply line.

To be able to exert a pressure on the catalytic material of the adjacent cells, the pressure in the cavities of the contact pieces must be greater than the pressure in the adjacent gas chambers. In electrochemical cells serving to generate a current, such as fuel cells and metal/air cells, to which gaseous reactants are generally supplied for this purpose, the pressure of the pressurized medium must therefore be greater than that of the reacting gases. Despite this requirement, however, no difficulties arise even in the case where one of the gaseous reactants of the battery is used as pressure gas and the cavities are accordingly connected to the appropriate gas supply system of the battery. For, the pressure of the gaseous reactants is always higher than the actual operating pressure, generally at least 5 bar, so that, in the situation described, only two stages need be provided to reduce the gas pressure of the respective reactant to the pressure of the pressure medium, on the one hand, and to operating pressure, on the other hand such as 3 and 2 bar, respectively, (pressure difference: 1 bar). A pressure difference of 0.3 bar approx. is already sufficient for perfect operation of the battery according to the present invention.

Advantageously, the design of the battery according to the present invention is as known essentially from the U.S. Pat. No. 3,979,224. This battery consists of individual components, for the assembly of which asbestos diaphragms, are cemented into recesses at the rims of plastic frames which have both main channels and supply channels for the gaseous reactants and for the electrolyte. To form a so-called subassembly, two such components are disposed facing each other in mirror-image fashion and cemented to each other at the plastic frames, there being disposed between the asbestos diaphragms within the cemented plastic frame a supporting frame and, on the asbestos diaphragm sides facing away from the supporting frame, a catalytic material in powder form, strengthened by binders if applicable and supported by a spacer screen. Disposed between the spacer screens of each two adjacent subassemblies is a current collector for each in the form of a sheet metal contact, around the rim of which is molded an elastomer, the elastomer layer being provided with openings for the main channels for the reactants and the electrolyte and cemented to the plastic frame of the two adjacent subassemblies. At each battery end, a corresponding sheet metal contact is cemented to the plastic frames of the end subassemblies, and an end plate is attached to each of these sheet metal contacts. The end plates may be of plastic or of a plastic coated metal, the holes in the end plates being likewise plastic coated.

It is of further advantage in the battery according to the present, when gas routing means are pressed into the contact pieces, i.e., flow channels, to effect uniform distribution of the reaction gases over the entire electrode surface. For this purpose, the contact pieces each preferably consist of two pieces of corrugated, thin sheet metal joined to each other at the rim. The cavity for the pressure medium is then located between the two pieces of sheet metal; the gas flow channels are formed by the sheet metal corrugations on the outside of the contact pieces. The thin sheet metal pieces are flexible and therefore assure the exertion of a uniform bearing pressure. Joining the rims of the two sheet metal pieces is accomplished particularly well by seam welding which assures intimate and good adhesion. This is necessary in particular because the individual battery cells are electrically connected in series via the contact pieces.

Besides the advantage resulting from the isostatic pressing of the electrodes, the battery according to the present invention offers a number of other advantages which are also a result of the use of the special kind of current collectors, i.e. the contact pieces. For example, in contrast to the usual assembly of batteries by the filter press technique which requires a compression of the entire area of the stacked components, i.e., at the edge as well as at the inner surface, the assembly of the battery according to the present invention merely requires sealing forces, i.e. an exertion of pressure on the rim zones only, but not on the actual electrode surface is needed. This results in a simplification of the battery assembly, and this, in turn, in an easing of the sealing problems. Beyond this, the application of a defined sealing force is possible.

Due to the fact that the pressure in the cavities of the contact pieces is built up only during the operation of the battery, the possibility of assembling the battery from subassemblies also exists. For, since a pressure is exerted only on the rim areas of the battery according to the present invention the danger of the subassemblies having no end plates being pushed apart again after assembly is nonexistent. In addition, the possibility of using subassemblies opens up the possibility to standardize and to improve the test procedures during battery production. Furthermore, the assembly from subassemblies or part blocks offers the additional advantage that defective battery parts can be replaced relatively simply. It has also proven advantageous that manufacturing tolerances no longer have such an adverse effect because thickness deviations of the battery components are equalized with relative ease by the pressure applied.

Finally, the battery according to the present invention also provides the possibility of a simple potential separation, i.e. of an electrical disconnect, in particular of part blocks. For, if metallic conductors to carry the current away are disposed at the contact pieces between the part blocks and in front of the end plates, a simple relief of the pressure medium will cause the metallic contact between the contact piece and the current conductor to break. This electrically shuts off the part block or the entire battery. However, this requires that the pressure of the reaction gases be maintained, with pressure also remaining between contact piece and current conductor.

DETAILED DESCRIPTION OF THE INVENTION

Figure 1:
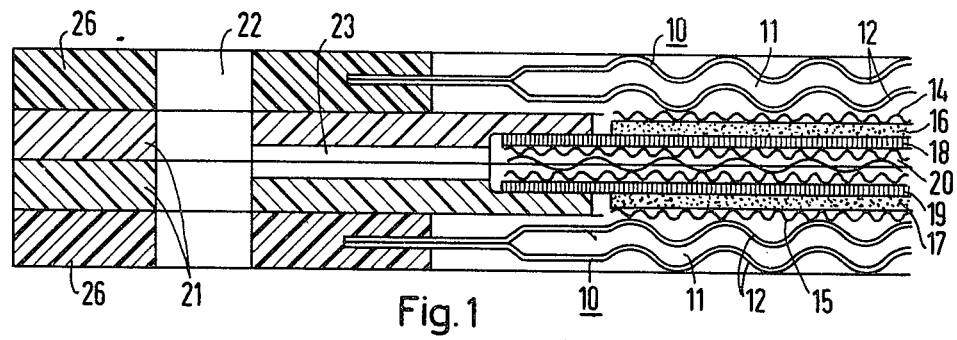
FIG. 1 is a cross section view, in a first direction, of a fuel battery according to the present invention.
Figure 2:
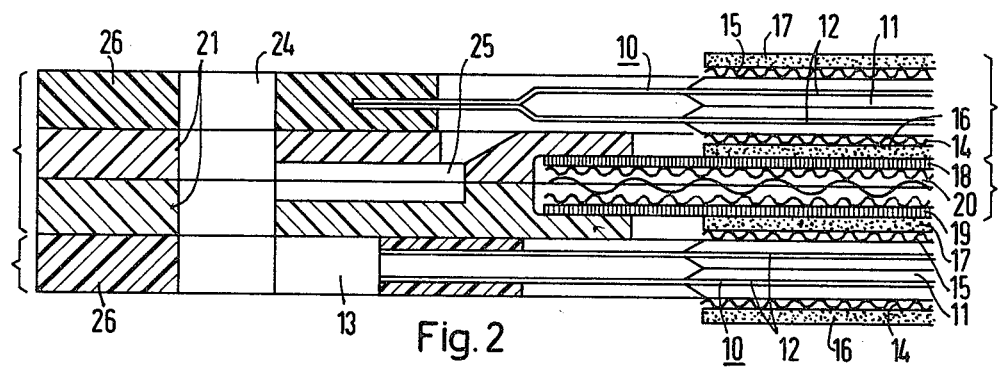
FIG. 2 is a similar view of the cell of the present invention in a direction perpendicular to that of FIG. 1.

Shown in FIGS. 1 and 2, in which identical parts have the same reference symbols, is a sectioned portion of a particularly preferred embodiment of the battery according to the present invention, i.e., of a fuel battery for the conversion of gaseous reactants. FIG. 1 is a section of the electrolyte channel, perpendicular to the corrugations of the corrugated contact piece. FIG. 2 is a section perpendicular thereto, i.e. in the direction of the corrugations, this section going through two planes, once through the gas channel and the other time through the channel for the pressure medium.

The fuel battery, shown in portion in FIGS. 1 and 2, contains contact pieces 10, each of which contains a cavity 11. Each contact piece 10 consists of two 0.2 mm thick, corrugated pieces of nickel sheet 12 joined to each other at their rim by seam welding; the corrugations of the nickel sheets are 1.1 mm high. The pressure medium is supplied to the cavity 11 of each contact piece through a channel 13 (see FIG. 2). The diameter of the cavities is 0.6 mm.

Adjacent to each contact piece 10 are two nickel screens 14 and 15 which are 0.3 mm thick and serve to support and make contact with the electrodes 16 and 17, respectively, of the catalytic material. The oxygen electrodes 16, each of which has a thickness of 0.9 mm together with the silver plated nickel screen 14, contain doped silver bonded with asbestos and polytetrafluoroethylene, i.e., silver with a small bismuth, nickel and titanium hydroxide content (see U.S. Pat. No. 3,900,342). The hydrogen electrodes 17, together with the associated nickel screen 15, are likewise 0.9 mm thick each; they consist of titanium containing Raney nickel (see "J. Electrochem. Soc.", Vol. 124, 1977, pages 1 to 6) which is also bonded with asbestos and polytetrafluorethylene. One contact piece 10, together with the adjacent screens 14 and 15 and the electrodes 16 and 17, always forms a so-called electrode unit which, in the present case, comprises a bipolar electrode (see FIG. 2).

Disposed on the sides of the electrodes 16 and 17 facing away from the (spacer) screens or contact pieces are asbestos diaphragms 18 and 19, each 0.3 mm thick. Disposed between the asbestos diaphragms 18 and 19 is a support frame or support screen 20 for each which is 1.1 mm thick and which consists of three nickel screens, for example, of which the central screen is thicker and wider-meshed than the two outer screens. Together with the two adjacent asbestos diaphragms 18 and 19, the support screen 20 forms a so-called electrolyte unit (see FIG. 2).

The asbestos diaphragms 18 and 19 are each cemented into recesses in plastic frames 21 which consist preferably of polysulfone, but molding compounds on epoxy resin bases may also be used for the plastic frames. Two such plastic frames with asbestos diaphragms cemented in are disposed so as to face each other in mirror-image fashion and cemented to each other. The plastic frames 21 contain both the main channels and the supply channels for the intake and outlet, respectively, of the gaseous reactants and of the electrolyte fluid, as well as the channels for the pressure medium. In FIG. 1 a main electrolyte channel 22 and an electrolyte supply channel 23 is illustrated. In FIG. 2 a main channel 24 and a supply channel 25 for one of the reaction gases, oxygen in the present case, is shown. It may further be learned from FIG. 2 that a part of the gas supply channel 25 is worked into the plastic frame 21 in the form of an oblique recess.

Molded around the rim of each contact piece 10, i.e., in the area of the joint of the two nickel sheets 12 is an elastomer, preferably a copolymer of propylene oxide and allylglycidyl ether. Before the application of the elastomer, the contact pieces may be immersed in an adhesive. The adhesive is then dried and the elastomer subsequently pressed around it. The elastomer layers or frames 26, into which the main channels for the electrolyte fluid and the reaction gases, as well as for the pressure medium, are worked, are cemented to the plastic frames 21. An adhesive compound on an epoxy resin base is preferably used for cementing.

The characteristic current/voltage curve of a fuel battery constructed as described above is shown in FIG. 3. The fuel battery comprised 13 fuel elements and was operated with oxygen and hydrogen as reaction gases (operating pressure 2 bar each). Nitrogen served as pressure medium at a pressure of 3 bar. Potassium hydroxide was used as electrolyte fluid (density: 1.225 g/cm$^3$); the electrolyte temperature was about 85° C. The cell or electrode dimensions were 245 mm×240 mm; the active electrode surface was 340 cm$^2$ (185 mm×185 mm approx.).

Figure 3:
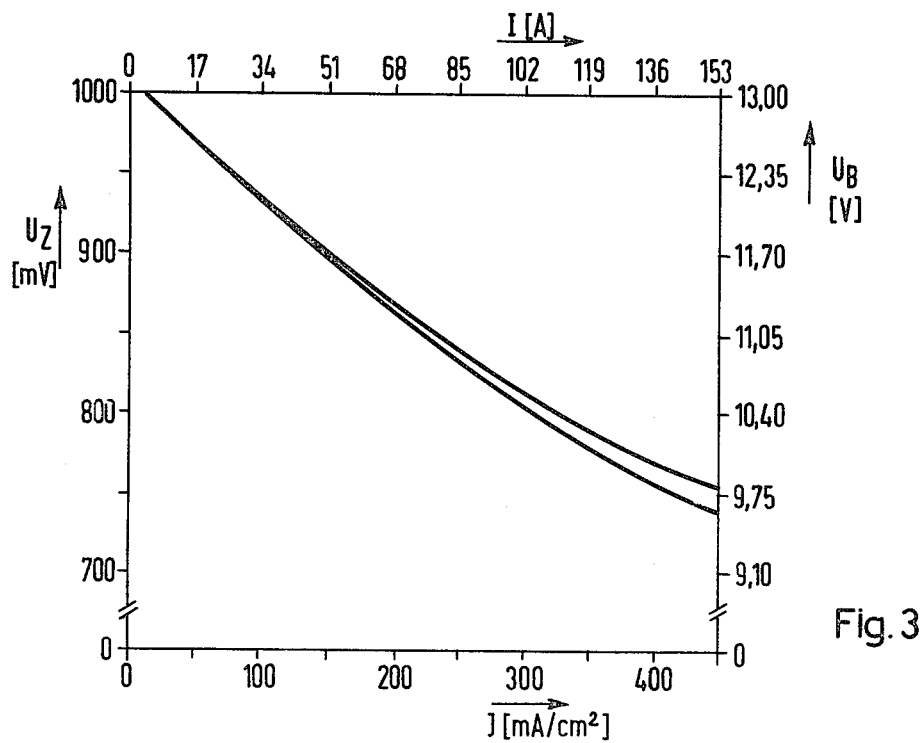
FIG. 3 is a plot of current and current density versus voltage.

It may be seen from FIG. 3, in which the current density J in mA/cm$^2$ and the amperage I in A, respectively, are plotted on the abscissa and the cell voltage $U_Z$ in mV and the battery voltage $U_B$ in V, respectively, are plotted on the ordinate, that, in the battery according to the present invention, no deviations in the current/voltage characteristic of the individual cells occur at low current densities, i.e., current densities up to about 150 mA/cm$^2$. It is only at higher current densities that small variations in the cell voltage occur. However, at a current density of 450 mA/cm$^2$, for instance, the variation is only about 13 mV and does not increase even after an operating period of several 100 hours.

In contact thereto, a variation of almost 200 mV occurs, for instance, in a 50 cell battery of corresponding construction, but with simple sheet metal contacts as current collectors (see U.S. Pat. No. 3,979,224) at a current density as low as 140 mA/cm$^2$, i.e., at less than one third of the above mentioned current density of 450 mA/cm$^2$; and the cell voltage of the individual cells varies between about 620 and 815 mV. Operating conditions: $H_2$-pressure: 1.88 bar; $O_2$-pressure; 1.86 bar; electrolyte fluid: KOH (density: 1.25 g/cm$^3$ approx.); electrolyte temperature: 80° C. approx.

Besides its use in hydrogen/oxygen fuel batteries, the subject of the present invention can also be applied to batteries operated with air as an oxidizing agent or with carbon monoxide or $CO/H_2$ mixtures as fuel. In addition, the subject of the present invention can also be employed in fuel batteries in which only one gaseous reactant is converted, i.e., in which the individual cells contain only one gas diffusion electrode each. Such fuel batteries are, for instance, hydrazine, methanol, or glycol batteries as well as batteries for the conversion of formiate or hydrocarbons. Another application involves metal/air or metal/oxygen batteries. Finally, their use in other electrochemical cells can also be considered, especially in electrolyzers.

What is claimed is:

1. In a battery, consisting of a multiplicity of electrochemical cells, in particular fuel cells for the conversion of at least one gaseous reactant, with a support frame for the accommodation of a liquid electrolyte for each cell; with a diaphragm, gastight in a liquid impregnated state, on at least one side of the support frame; with an electrode of catalytic material in powder form, strengthened by binders if applicable, on the diaphragm side facing away from the support frame; and with a spacer screen for the support of the catalytic material, as well as with pressure pads for the compression of the entire arrangement, the improvement comprising, metallic contact pieces for current collection disposed between the spacer screens of each two adjacent cells and at the battery ends forming said pressure pads, with each contact piece containing a cavity to which a pressurized medium can be supplied, in the sense of the exertion of a uniform bearing pressure on the catalytic material of the adjacent cells.

2. The improvement according to claim 1, wherein the cavities of the contact pieces are connected through channels to the supply system of one of the gaseous reactants, preferably hydrogen.

3. The improvement according to claim 1 or 2, wherein gas routing means for the gaseous reactants are pressed into the contact pieces.

4. The improvement according to claim 3 wherein the contact pieces each consist of two corrugated, thin pieces of sheet metal joined to each other at their rims.

5. The improvement according to claim 4 wherein said pieces are joined by seam welding.

6. The improvement according to claim 5, wherein an elastomer is molded around the rim of each contact piece and wherein the contact pieces are disposed between adjacent cells enclosed by plastic frames or between an end cell and a battery end plate consisting of plastic or metal coated with plastic, respectively.

7. The improvement according claim 1 wherein an elastomer is molded around the rim of each contact piece and wherein the contact pieces are disposed between adjacent cells enclosed by plastic frames or between an end cell and a battery end plate consisting of plastic or metal coated with plastic, respectively.

8. The improvement according to claim 2 wherein an elastomer is molded around the rim of each contact piece and wherein the contact pieces are disposed between adjacent cells enclosed by plastic frames or between an end cell and a battery end plate consisting of plastic or metal coated with plastic, respectively.

9. The improvement according to claim 3 wherein an elastomer is molded around the rim of each contact piece and wherein the contact pieces are disposed between adjacent cells enclosed by plastic frames or between an end cell and a battery end plate consisting of plastic or metal coated with plastic, respectively.

10. The improvement according to claim 4 wherein an elastomer is molded around the rim of each contact piece and wherein the contact pieces are disposed between adjacent cells enclosed by plastic frames or between an end cell and a battery end plate consisting of plastic or metal coated with plastic, respectively.

* * * * *